United States Patent

[11] 3,571,912

[72] Inventor Ervin J. Kielma
 Milwaukee, Wis.
[21] Appl. No. 737,415
[22] Filed June 17, 1968
[45] Patented Mar. 23, 1971
[73] Assignee Kearney & Trecker Corporation
 West Allis, Wis.

[54] MULTITOOL TOOL CHANGER
 5 Claims, 14 Drawing Figs.

[52] U.S. Cl. .................................................. 29/568,
 214/1
[51] Int. Cl. ................................................ B23q 3/157
[50] Field of Search .......................................... 29/568;
 214/1.B3, 1.B4, (Inquired); 10/12

[56] References Cited
UNITED STATES PATENTS
3,188,736 6/1965 Brainard et al. .............. 29/568
3,355,798 12/1967 Drechsler .................... 29/568

Primary Examiner—Andrew R. Juhasz
Assistant Examiner—F. R. Bilinsky
Attorney—Donald E. Porter and Robert C. Jones ABSTRACT: The disclosure relates to a multitool tool changer and to a tool storage associated therewith for a multispindle machine tool wherein it is possible to select and effect an interchange of tools for each spindle of the multispindle machine tool simultaneously.

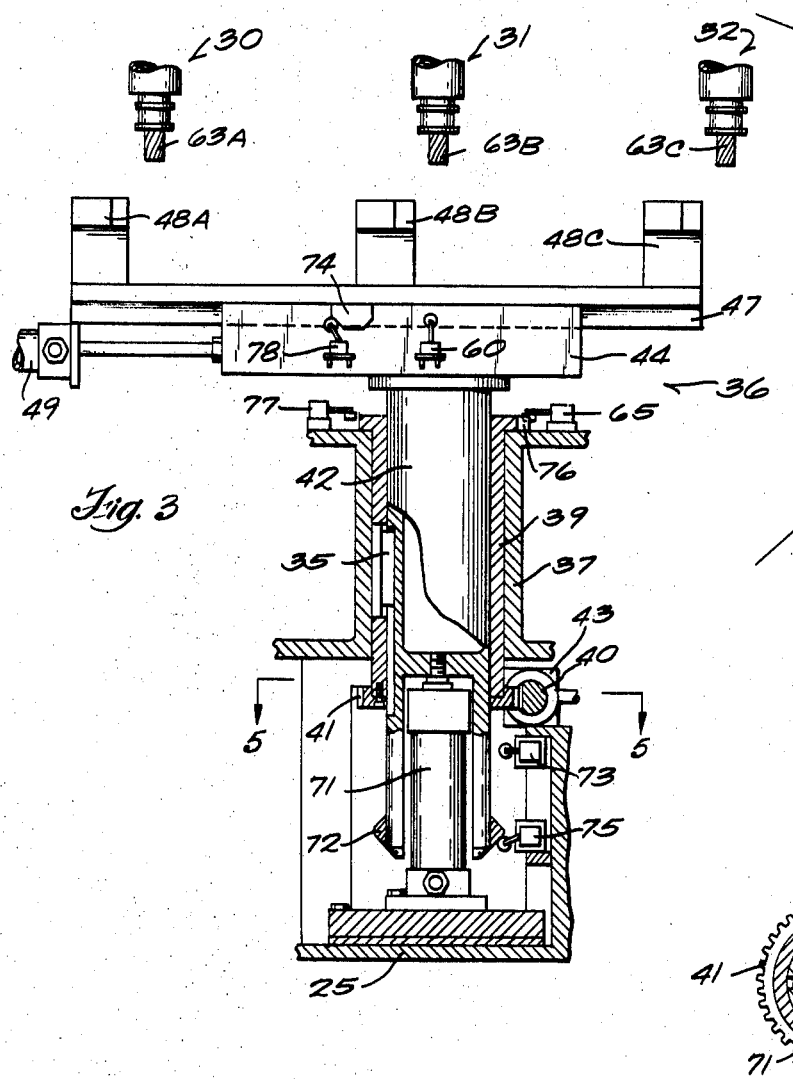
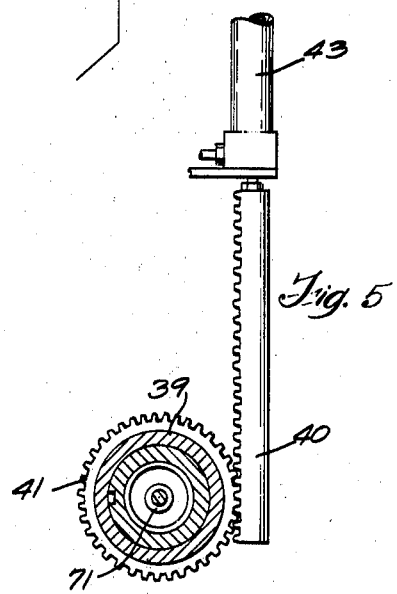
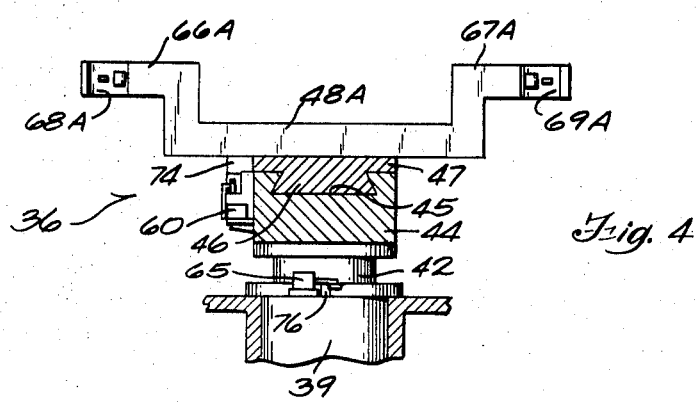

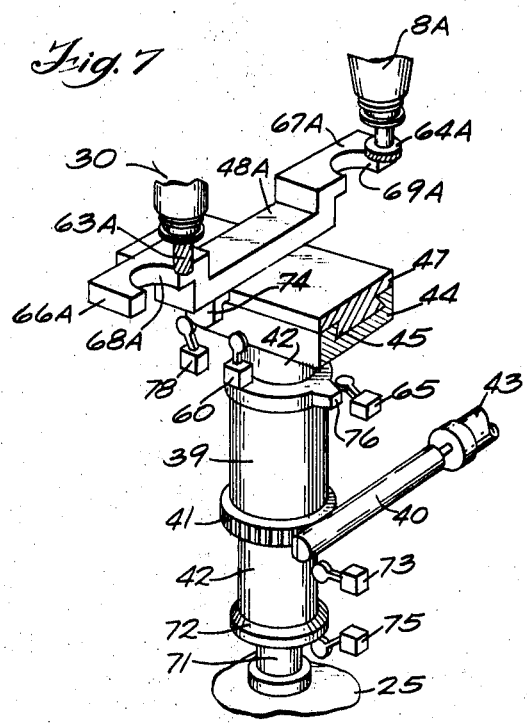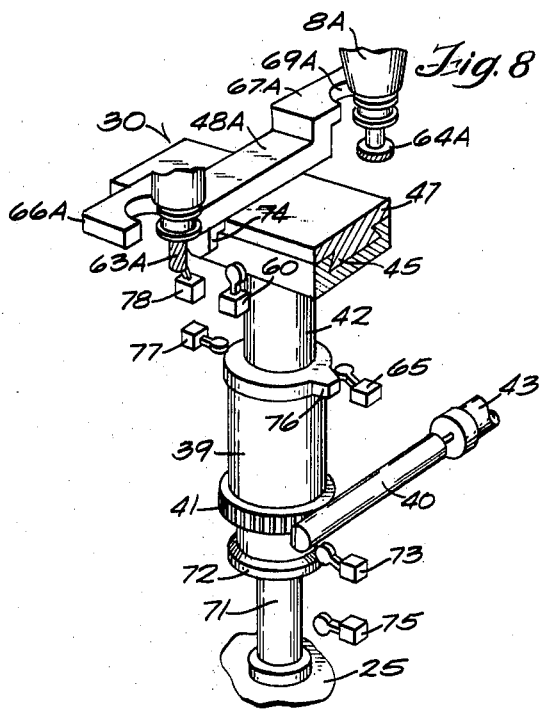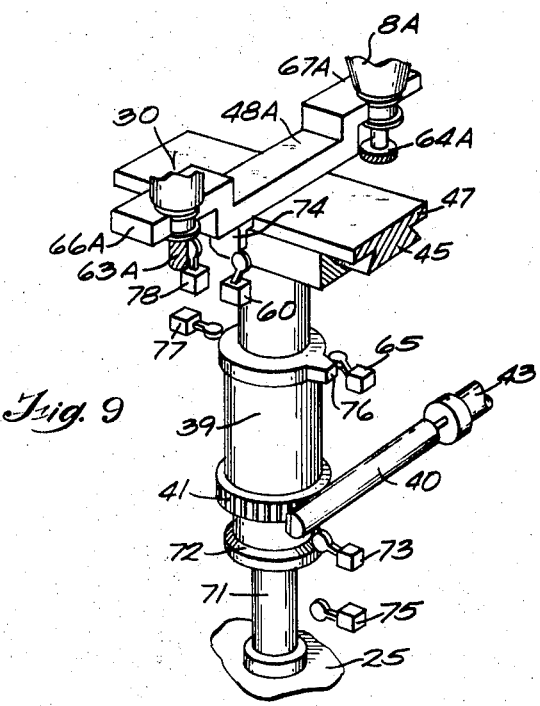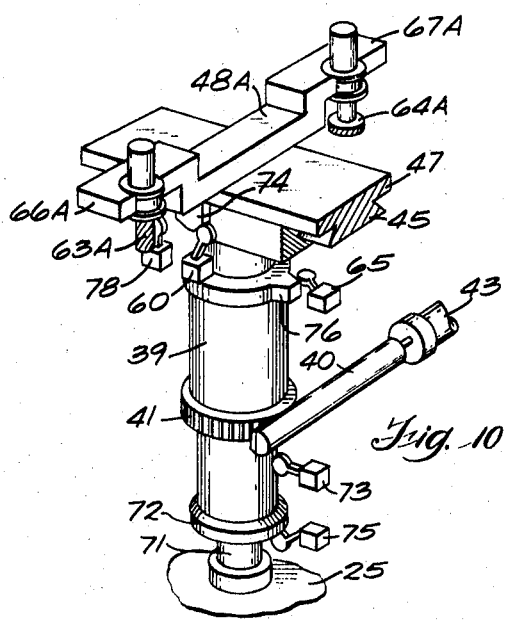

Inventor
Ervin J. Kielma
By Robert C. Jones
Attorney

MULTITOOL TOOL CHANGER

BACKGROUND OF THE INVENTION

The invention relates to the metal working art and more especially to the improvement of multispindle machine tools. The improvement is applied in combination to a well-known multispindle machine tool and consists of the provision of a tool magazine for each spindle and tool changing means for simultaneously exchanging tools between the magazines and their associated spindles for different cycles of machining. The cycles of machining and the operation of tool changing are carried out under tape control.

The prior art discloses the combination of a single spindle machine tool, a tool magazine and tool changer operating under tape control, but no prior art is known that exchanges tools between a plurality of magazines and a plurality of spindles, either simultaneously or automatically. Prior to this invention, multispindle machines had to have the tools changed by hand, and, in many instances this was a particular problem where the tools were heavy cutters. Not only was there considerable labor involved in the manual changing of tools, spindle after spindle, in a multiple spindle machine, but the time consumed in the operation rendered the operation very inefficient. There are patents disclosing structure augmenting the manual exchange of tools where heavy cutters are involved, but these patents merely provide a support for holding and presenting heavy tools to a spindle and holding them while they are manually secured to or released from the spindle, the support being manually operated. These patents do not provide a holder for the used tool and a holder for the new tool, thereby further slowing down the operation.

BRIEF SUMMARY OF THE INVENTION

The invention consists of a multiple spindle machine tool in combination with a tool magazine for each spindle and a tool changing means for exchanging tools between the magazines and their associated spindles. In the detailed aspect of the invention, the tools are exchanged in the several spindles simultaneously and under tape control. In particular, the control is instigated by tape signals and partly carried out by sequence switching. The invention further lies in the particular operation and structure of the tool changer as well as the feature of driving the magazines in unison, thereby enabling the selection of tools with relation to one magazine being sufficient for all magazines, since the magazines carry identical series of tools in identical order and are driven to move in unison.

BRIEF DESCRIPTION OF THE DRAWINGS

FIG. 3 is an enlarged fragmentary view, partly in elevation and partly in vertical section, showing details of the tool changing actuating mechanism.

FIG. 4 discloses an end view of the tool changing arm and its slide support.

FIG. 5 is a fragmentary view of the actuating mechanism for rotating the tool change arm.

FIGS. 7 to 14 are a series of perspective views of the tool changer and actuating mechanism with one tool change member depicting its relation to the magazine and the spindle of the machine and discloses in sequence steps the operation of the apparatus during a tool exchange cycle of operation.

DETAILED DESCRIPTION OF THE PREFERRED EMBODIMENT

Figure 1:
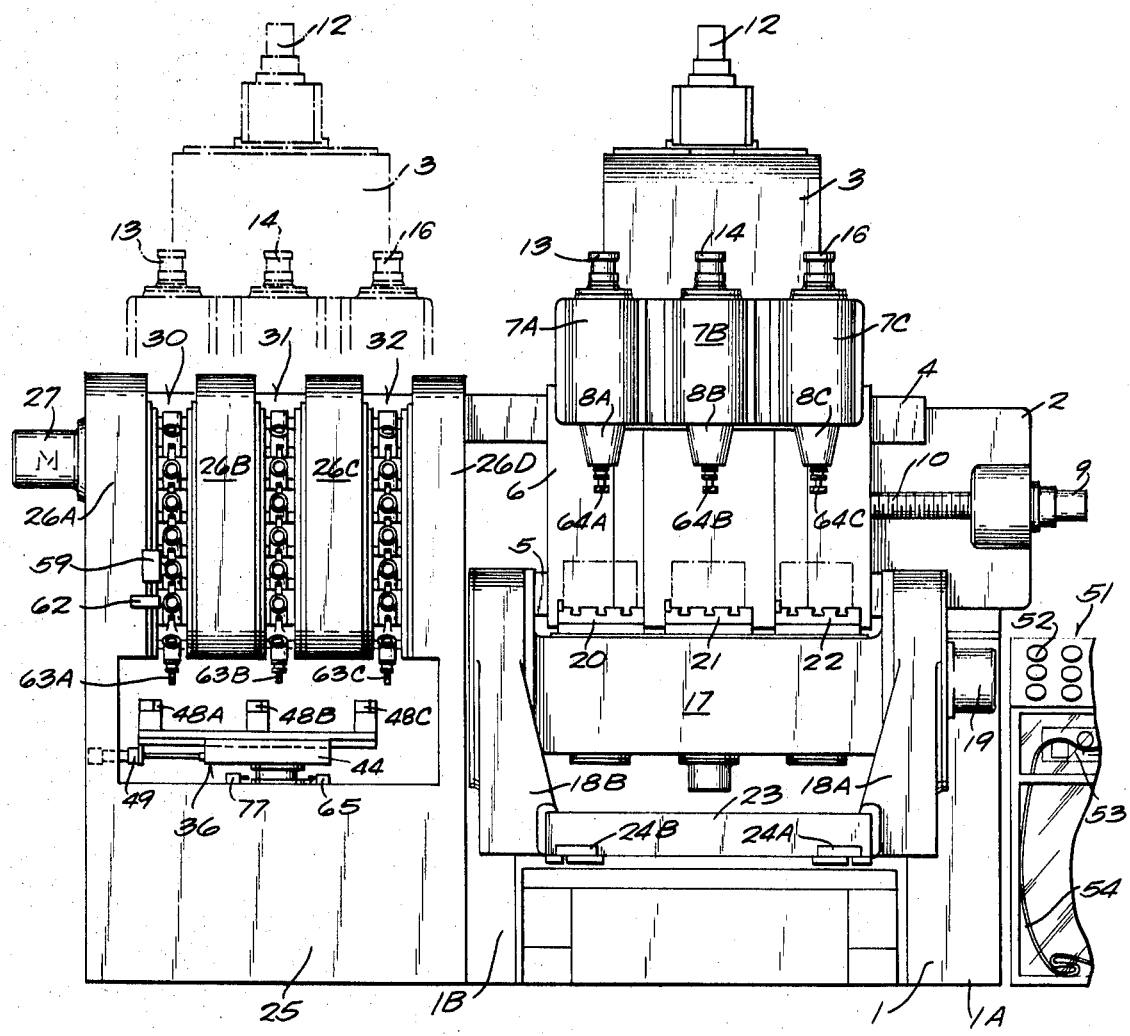
FIG. 1 is a view in front elevation of the machine tool incorporating multitool storage magazines and a multitool changing means.
Figure 2:
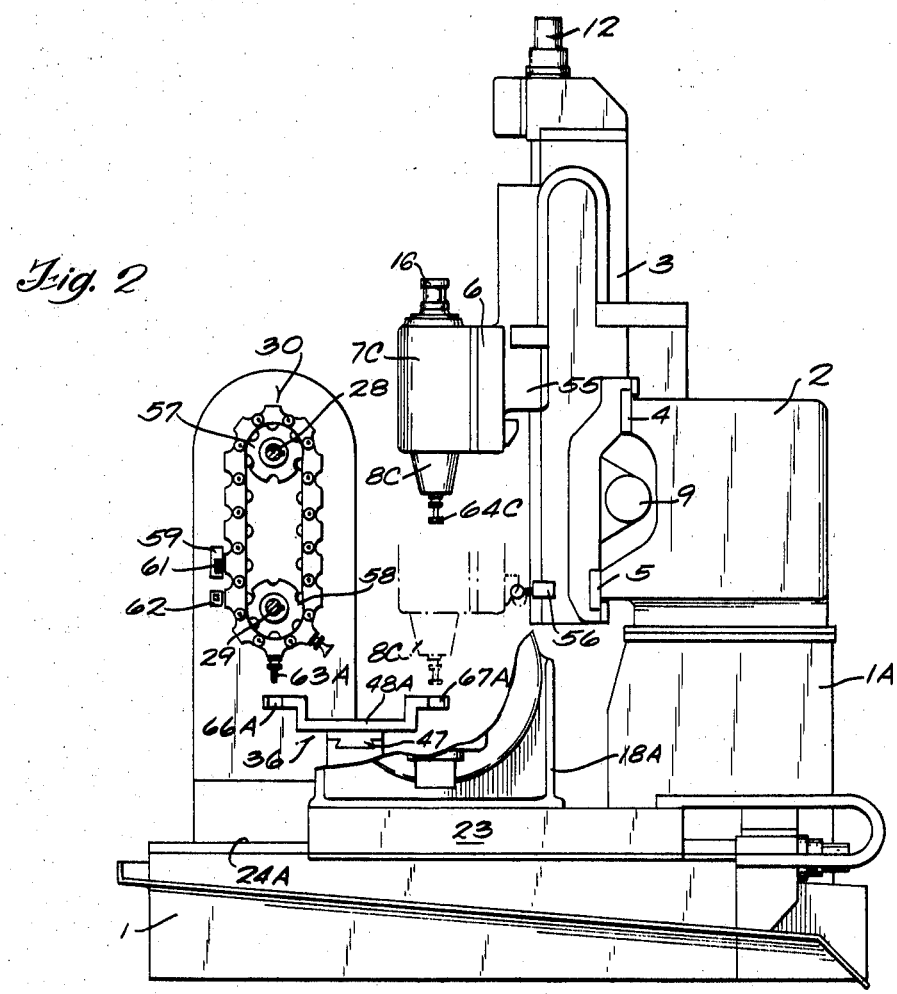
FIG. 2 is a view in right side elevation of the combined machine tool with parts broken away to disclose the spindle head which is shown in its upper position adjacent the tool magazines and in a lower position by broken lines in position for the tool changing operation.

As shown in FIGS. 1 and 2, the machine tool includes a base 1 having spaced uprights 1A and 1B which support a horizontal bridge 2 that is provided with guideways 4 and 5 for slidingly supporting saddle 3. Mounted on the saddle 3 for vertical sliding movement is spindle head 6 that carries three spindle housings 7A, 7B and 7C in which tool operators or spindles 8A, 8B and 8C are rotatably supported. This particular disclosure illustrates three spindles for machining three identical articles; however, any number of multiple spindles could be used without departing from the spirit and scope of the invention. The saddle 3 is reciprocated by a motor 9, FIG. 1, which drives a screw 10 in the usual manner. The spindle head 6 is driven in its vertical path of travel by the motor 12 in the usual manner. Each of the spindles have their own motors 13, 14 and 16. In front of the bridge 2 and saddle is positioned a work table support 17 and a series of work tables 20, 21 and 22 equal in number to the number of spindles involved, and each table is mounted and driven for either indexing or rotary motion. As herein represented, the table support 17 is mounted for pivotal movement about a horizontal axis in a pair of spaced trunnions 18A and 18B which are secured to an X-axis platen 23. The platen 23 is movable along an X-axis on slideways 24A and 24B carried by the bed 1. Power for effecting the pivotal movement of the table support 17 is obtained form a motor 19 connected in a well-known manner to effect the desired pivotal movement of the table support. The machine tool just described is well known in the art and need not be further described.

Disposed adjacent the machine tool is an auxiliary base 25 having four spaced uprights 26A to 26D, inclusive. Journaled in the uprights 26A and 26D, inclusive, is an upper horizontal shaft 28 and a lower horizontal shaft 29. Located in each of the spaces between the vertical uprights are chain magazines 30, 31 and 32 which are trained about associated upper and lower sprockets. The upper and lower sprockets 57 and 58 associated with the magazine 30 are shown in FIG. 2, and are representative of the upper and lower sprockets associated with the chain magazines 31 and 32. As shown the upper sprocket 57 is keyed to the shaft 28 for a drive connection therewith and is disposed in driving engagement with the chain magazine 30. Similarly the sprocket 58 is keyed to the lower shaft 29 for a driving connection therewith and is likewise disposed in driving engagement with the chain magazine 30. A motor 27, mounted on the upright 26A, is operably connected through a suitable transmission (not shown) to drive the shafts 28 and 29 in unison in the same direction.

Since each of the chain magazines 30, 31 and 32 are driven by the shafts 28 and 29, they will move in unison. It is here noted that the tools from row to row across the magazines are identical so that the selection of a tool stored in the magazine 30 will likewise select identical tools stored in the magazines 31 and 32. Selection of a desired tool is made by code reader 59 having feeler fingers 61 which feel the codes on the tools as the chain magazine 30 moves the tools in their path of travel past the reader 59. When the selected tool is read, a counter 62 is actuated to keep the chain moving until the selected tool moves from its position adjacent the reader 59 to the lowermost downwardly facing position which is the tool change position. In this way, the reader 59 can be placed anywhere along the path of travel of the chain magazine 30 and the counter 62 set in accordance with its position to count the number of sockets of the magazine 30 that need to pass the counter to effect the positioning of the socket which contains the selected desired tool at the downwardly facing tool change position. For example, in FIG. 2, the reading head 59 is positioned so that three sockets have to move past the counter 62 before the selected tool reaches the downwardly facing tool change position. Thus the counter 62 is set to count three sockets and when a count of three is registered, the counter will operate to stop the operation of the motor 27 and the selected desired tools, represented by the tools 63A, 63B and 63C, will be located in the tool change position.

It will be noted that the guideways 4 and 5 in FIG. 1 extend from the right side of the machine tool all the way across the back of the bridge 2 to a position behind the upright 26A so that the saddle 3 may move from the position it occupies as depicted in full lines in FIG. 1, to a position adjacent the magazines 30, 31 and 32 depicted by the broken lines in FIG. 1.

To effect the simultaneous changing of the tools 64A, 64B and 64C in the spindles 8A, 8B and 8C, the saddle 3 must be moved leftwardly as viewed in FIG. 1 to a position depicted by the broken lines in FIG. 1. In this position the axes of the spindles 8A, 8B and 8C will be disposed in the same vertical plane in which the axes of the selected desired tools 63A, 63B and 63C are disposed. After this position has been obtained, the spindle head 6 is moved downwardly into a position depicted by the broken lines in FIG. 2. With the spindle head 6 in the position depicted by the broken lines in FIG. 2, the tools 64A, 64B and 64C carried in the spindles 8A, 8B and 8C, respectively, will be positioned at the same level and directly across from the selected desired tools 63A, 63B and 63C in the magazines 30, 31 and 32, respectively.

A tool exchange is carried out by the tool change mechanism, generally noted by numeral 36, which is disposed in operative position between the magazines 30, 31 and 32 and the spindles 8A, 8B and 8C. The tool change mechanism 36, as shown in FIG. 3, includes a tubular support 37 formed in the base 25. A tubular bearing sleeve 39 is supported in the tubular support 37 for rotation by operation of a rack 40 and pinion 41 as more fully disclosed in FIG. 5, wherein the rack 40 is reciprocated by fluid motor 43 as disclosed. Mounted for reciprocation within the bearing sleeve 39 and connected for rotation therewith by a key 35 is a support shaft 42. The shaft 42 has a head block 44 that carries the tool engaging members 48A, 48B, and 48C. To this end the upper surface of the head block 44 is provided with a dovetail guideway 45 adapted to slidably receive a complimentary guide 46 formed on the under surface of a slide 47. Movement of the slide 47 relative to the head block 44 is accomplished by operation of fluid motor 49, shown in FIG. 3.

Figure 6:
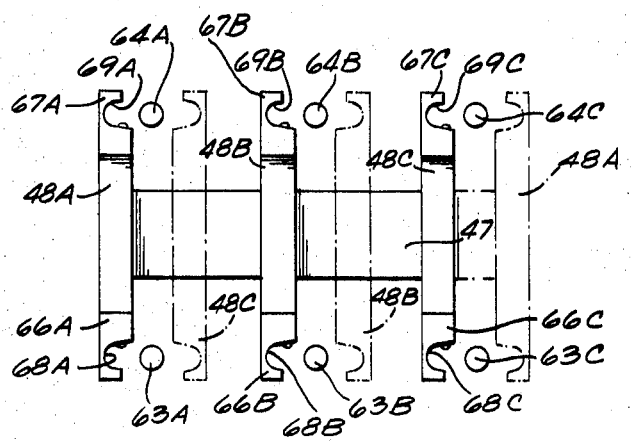
FIG. 6 is a diagrammatic view of the position of the tool changing arm prior to and after a tool change.
Figure 11:
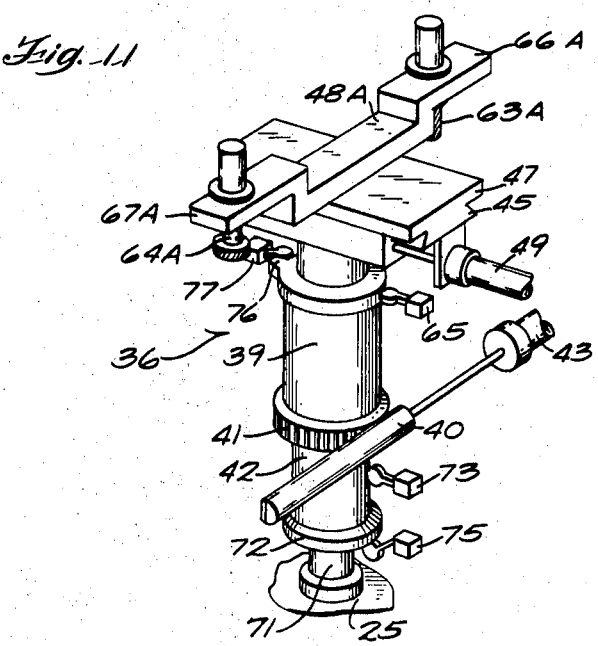

The tool changer 36 disclosed herein is provided with three double ended tool engaging members 48A, 48B and 48C which are mounted on the slider 47 and spaced apart from each other a distance equal to the distance between the axes of two adjacent spindles in the head 6. With this arrangement, the three tool engaging members 48A, 48B and 48C move bodily with the slide 47 in its axial movement as imparted to the slide through the operation of the hydraulic motor 49; and in a rotary movement about the axis of the support shaft 42 as effected by the rack 40. Each tool change member is identical and a description of one will apply equally to all. As shown in FIG. 4, the tool change member 48A associated with the spindle 8A and the tool storage magazine 30 combination, is provided with elevated sidearms 66A and 67A each having tool grips 68A and 69A, respectively. It will be seen that when the support shaft 42 is elevated it will place the grips 68A and 69A associated with the tool change member 48A opposite the tools 36A and 64A, so that movement of the slide 47 along the guideway 45 will move the grips 68A and 69A into engagement with the tools 36A and 64A. Thereafter the support shaft 42 will be lowered to withdraw the tools 36A and 64A out of the magazine 30 and the spindle 8A. In order to associate tool grippers with each of the spindle magazine combinations, hereshown as three, each of the tool change members 48A, 48B and 48C are provided with tool grips 68A and 69A; 68B and 69B; and 68C and 69C, respectively, as depicted in FIG. 6, so that when all of the grippers are elevated and the slide 47 is moved rightwardly, as viewed in FIGS. 3 and 6, each one of the tool grips will engage a tool in an associated spindle and also a tool in an associated magazine for simultaneously interchanging tools between all of the spindles and all of the magazines. After the tools have been engaged and the support shaft 42 lowered to withdraw the tools out of the magazines and the spindles as aforesaid the entire mechanism is bodily rotated by operation of the rack 40 so that the tools 64A, 64B and 64C formerly in the spindles 8A, 8B and 8C are now aligned with the magazines 32, 31 and 30 and the tools 36A, 36B and 36C formerly in the magazines 30, 31 and 32 are aligned with the spindles 8C, 8B and 8A, respectively. Thereafter, the support shaft 42 will be raised to insert the tools that have been previously used into magazines 30, 31 and 32 and the new tool into the spindles 8A, 8B and 8C for the next cycle of machining. FIG. 6 discloses a top view of all of the tool changers located with respect to the tools 64A, 64B and 64C in the spindles 8A, 8B and 8C, respectively, and the tools 63A, 63B and 63C in the magazines 30, 31 and 32, respectively. As shown in full lines, tool change member 48A is associated with magazine tool 64A and spindle tool 63A, member 48B is associated with the magazine tool 64B and the spindle tool 63B and the tool change member 48C is disclosed in association with the magazine tool 64C and the spindle tool 63C. It will be noted that in each of these situations the tool grips are facing to the right, as viewed in FIG. 6, so that rightward movement of the slide 47 will operate to move all of the tool grips into engagement with their respective tools. After tool engagement has been effected, the entire tool changer will be lowered to thereby withdraw all of the tools from the three magazines and the three spindles simultaneously. Thereafter the entire tool change assembly 36 will be bodily rotated 180° to interchange the position of the tools so that all of the previously used tools withdrawn from the spindles 8A, 8B and 8C will be moved into axial alignment with the storage sockets in the magazines 32, 31 and 30, respectively. At the same time the selected new tools withdrawn from the magazines 30, 31 and 32 will be positioned in axial alignment with the spindles 8C, 8B and 8A, respectively. Thereupon the changer assembly 36 will be moved upwardly inserting the selected new tools into the spindles and at the same time, inserting the previously used tool into the storage sockets of the magazines 30, 31 and 32. After the tool interchange operation has been accomplished, the slide 47 will be moved rightwardly, as viewed in FIG. 6, into the position depicted by broken lines in FIG. 6 to disengage the changer members 48A, 48B and 48C from the tools. It will be noted that the movement of the slide 47 in its tool engaging and tool disengaging movements have been stated as being in a rightward direction with respect to the showing made in FIGS. 3 and 6. This is true because as in the first instance prior to a rightward tool engaging movement of the slide 47, the tool change members 48A, 48B and 48C are to the left of the tools with their respective tool grips facing rightwardly, as viewed in FIG. 6. Therefore, to engage the tool grips with the tools in the spindles and in the magazine, the slide 47 must be moved in a rightwardly direction as viewed in FIG. 6. As previously mentioned a tool interchange requires the tool change assembly 36 to be rotated 180°, and this bodily rotation also includes the rotation of the head 44 and the slide 47. Therefore, after a 180° bodily rotation of the changer assembly has been accomplished, the slide actuator 49 will be to the right of the support shaft 42 as viewed in FIG. 3, just opposite to the showing made in FIG. 3. Thus, to effect a disengagement of the tool change members 48A, 48B and 48C from the tools, the slide 47 will again be moved rightwardly as viewed in FIG. 6.

The entire machine is operated in automatic mode under tape, or in manual mode and for this purpose, a console 51 is provided which includes manual controls 52 and the tape reader 53 for reading the tape 54. Under tape control the tape provides signals that control all the motivating motors for the tool slides that operate the spindles in their cutting procedures, operates the motors for the worktable supporting mechanisms and after a machining operation is completed, will start the initiation of a tool change cycle of operation. Tool selection of the particular tools to be used in the next machining operation has been made during the previous machining operation by commands from the tape. The manner in which the manual controls or the tap control operate to control the various mechanisms is well known in the art and need not be further described in this case.

Figure 12:
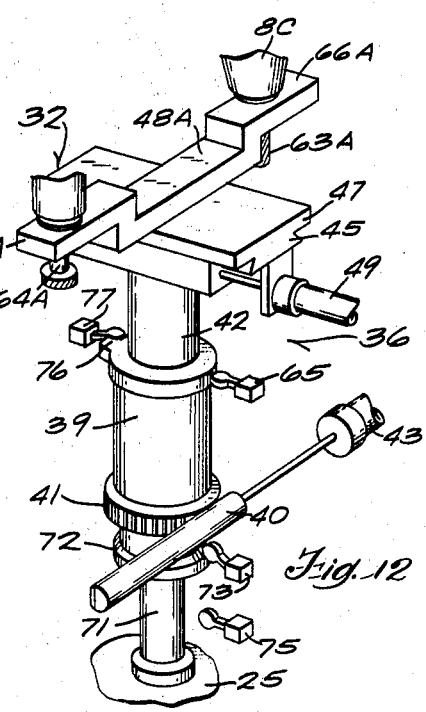
Figure 13:
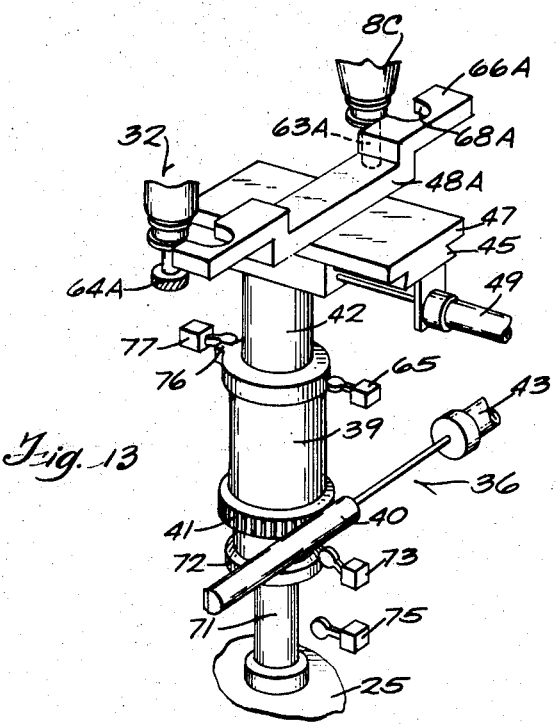
Figure 14:
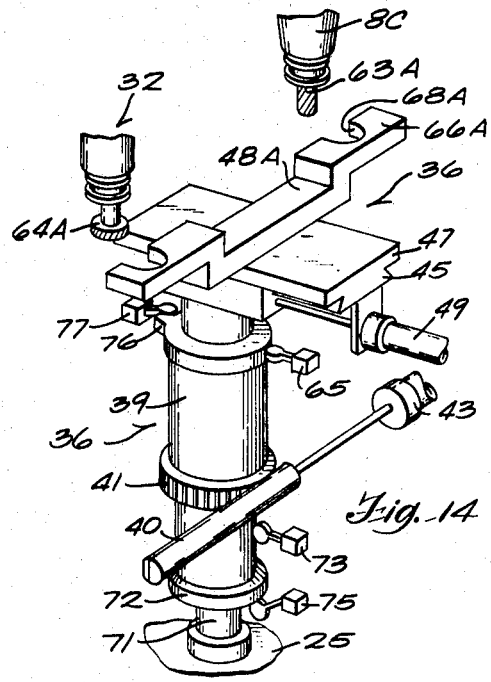

A complete cycle of tool change operations will be described in conjunction with FIGS. 7 to 14. Prior to a tool change the spindle head and saddle are left in a position as shown in full lines in FIG. 1. That is, after the last cut has been made by the tools the spindle head 6 is raised to the position shown in FIG. 1 by signals obtained from the tape. Thereafter signals from the tape will effect the actuation of the motor 9 to move the saddle 6 to the left until it is in the position it occupies as shown in broken lines in FIG. 1, whereupon signals from the tape actuate the spindle head motor 12 to lower the spindle head from the full line position in FIG. 2 to the broken line position and such movement will cause the spindle head frame portion 55 to engage the switch 56 which stops the tape during the interchange and actuates a circuit to effect the operation of the fluid motor 71 to lift the support shaft 42 upwardly, thereby moving the tool changer assembly 36 from its normal parked position as depicted in FIG. 7, wherein the tool changer member 48A has its grips 68A and 69A facing in the direction of the tools 63A and 64A. With the tool changer 36 in its normal parked position a circular cam 72 on the lower end of the skirt of the supporting shaft 42 actuates the switch 75. Actuation of the switch 75 in cooperation with the actuated switch 56 will effect the operation of the motor 71 to move the shaft 42 upwardly and position the grips 68A and 69A of the tool change member 48A opposite the tools 63A and 64A, respectively. With the tool changer in elevated position the annular cam 72 will actuate the switch 73, the position of the changer mechanism at this point being depicted in FIG. 8. Actuation of limit switch 73 effects the energization of the fluid motor 49, FIG. 3, to cause the slide 47 to move to the right relative to the head 44, thereby moving the tools grips 68A and 69A into gripping engagement with the tools 63A and 64A as depicted in FIG. 9. With the slide 47 moved rightwardly to engage the grips 68A and 69A with the tools 63A and 64A, respectively, a cam 74 carried by the slide 47 will actuate a switch 60 to effect the operation of the spindle collets (not shown) to release the tools in the spindles 8A, 8B and 8C in a well known manner. Actuation of the switch 60 will also effect the operation of the fluid motor 71, FIG. 3, in a direction to lower the support shaft 42, thereby withdrawing the tools 63A and 64A out of the magazine 30 and the spindle 8A, respectively, to a position as shown in FIG. 10. With the tools withdrawn from the spindle 8A and magazine 30, the cam 72 will actuate switch 75. The actuated switches 60 and 75 will operate to effect the operation of the actuator 43 in a direction to rotate the tool change assembly 36 bodily 180° to effect a tool interchange. The 180° bodily rotation of the tool changer 36 will serve to move the tool change member 48A with the tools 63A and 64A from a position directly below the storage socket of the magazine 30 and the spindle 8A to a position wherein the selected new tool 63A is positioned in axial alignment with the spindle 8C and the previously used tool 64A is positioned below the downwardly facing empty storage socket of the magazine 32, as depicted by the position of the tool change member 48 48A in FIG. 11. It will be noted that at this time the tool change member 48C will be positioned so that the selected desired new tool 63C withdrawn from the magazine 32, which is the same as the tool 63A, will be positioned below the spindle 8A; and the previously used tool 64C withdrawn from the spindle 8C will be positioned below the downwardly facing empty storage socket of the magazine 30. Also, the position of the tool change member 48B will have also been reversed so that the selected new tool 63B, which is the same as the tools 63A and C, in the grip 68B is positioned below the spindle 8B; the previously used tool 64B in the grip 69B, which is the same as the tools 64A and 64C is positioned below the downwardly facing storage socket of the magazine 31. With the changer assembly 36 rotated 180° a cam 76 on the flange of the sleeve 39 will be positioned to actuate the switch 77 to activate the fluid motor 71 for operation in the opposite direction to raise the support shaft 42 and thereby move the changer assembly 36 from its position in FIG. 11 to the position as shown in FIG. 12. The upward movement of the changer 36 will insert the previously used tools as represented by the tool 64A into the socket of the magazine 30 and the newly selected tools, as represented by the tool 63A, into the spindle 8C. With the tool changer 36 in elevated position the cam 72 will engage and actuate the switch 73. With both of the switches 77 and 73 actuated they will cooperate to effect the operation of the fluid motor 46 in a direction to move the slide 47 rightwardly from the position it occupies as depicted in FIG. 12 to the position depicted in FIG. 13, thereby disengaging the grips of the tool change members 48A, 48B and 48C from the tools. The rightward movement of the slide 47 from the position depicted in FIG. 12 to the position depicted in FIG. 13 will cause the cam 74 to actuate the switch 78, FIG. 3. It will be understood that since the head 44 has been rotated bodily with the changer, the switch 78 cannot be depicted in either FIG. 12 or 13, as the side surface of the head 44 on which the switch is mounted is on the opposite side away from the viewer. With the switch 78 actuated, it will effect the operation of the fluid motor 71 to lower the changer members 48A, 48B and 48C from the position depicted in FIG. 13 to the position depicted in FIG. 14. Such movement will also cause the circular cam 72 to actuate the switch 75 to effect the operation of the fluid motor 43 in a direction to rotate the changer assembly 36 bodily 180° from the position it occupies in FIG. 13 to its initial parked position as depicted in FIG. 3. With the changer assembly 36 returned to its initial parked position the switch 65 will again be actuated and in cooperation with the actuated switches 75 and 78 will start up the tape reader 53 so that subsequent machine movements will be under tape control. From command signals obtained from the tape 54, the spindle head 6 will be moved from the tool change position represented by the broken line showing of the head in FIG. 2, to an upper position as illustrated in full lines. Thereafter the saddle 3 is moved rightwardly from the position depicted by the broken line illustration of the saddle in FIG. 1 to the position depicted in full lines. From the full line position in FIG. 1, the machine components under control of signals from the tape will be moved to perform a machining operation with the new tools. Although the illustration and the description of FIGS. 7 to 14 dealt with a single tool changer, it will be obvious that the other tool changers will follow the same operations as described and as previously pointed out.

From the foregoing detailed description of the structure and operation of the illustrated embodiment of the present invention, it will be apparent that an improved multiple tool tool changer for a multiple spindle machine tool has been provided which is especially adapted to facilitate the interchange of a plurality of tools between a multiple storage magazine and a multiple spindle machine tool automatically. Although the illustrative embodiment of the invention has been described in considerable detail for the purpose of making a full disclosure of a practical operative structure, it is to be understood that the various novel features of the invention may be incorporated in other structural forms without departing from the spirit and scope of the invention, as defined by the subjoined claims.

I claim:

1. In a machine tool having a plurality of tool operators adapted to hold tools for performing work operations:
   a tool storage magazine for each of said tool operators, said magazines being interconnected for movement together;
   tool selection means associated with one of said magazines for controlling its movement in a tool selection operation;
   means coupling said magazines together for simultaneous movement so that said single tool selection means serves to select the desired tools in each of said magazines;
   tool transfer means consisting of a double grip tool changer operating between each tool operator and an associated one of said tool storage magazines to exchange tools therebetween;

means joining said double grip tool changers for operation as a unit to effect a simultaneous interchange of tools between said tool operators and said magazines; and power means for effecting the operation of said tool transfer means in a tool change operation.

2. In a machine tool:

a frame;

a source of power;

a plurality of spindles supported by the frame for movement between a work zone and a tool change position, said spindles being adapted to operably receive tools for performing work operations;

a plurality of tool storage magazines movably carried by said frame and disposed at the tool change position, each of said storage magazines being adapted to carry a plurality of tools;

tool selection means connected to regulate the operation of said tool storage magazines for selectively locating a desired tool in each of said magazines at the tool change position for transfer to said spindles; and a tool change means operatively carried by said frame for simultaneously engaging and removing the selected tools from said magazines at the tool change position and transferring them to said spindles, while simultaneously engaging and removing the previously used tools from said spindles and returning them to storage in said magazines.

3. In a machine tool:

a plurality of tool operators;

storage means for tools for said tool operators comprising a separate magazine for each tool operator arranged to be moved simultaneously in a tool selecting operation;

a transfer member for transferring tools from said storage means to said tool operators, said transfer member being disposed between said magazines and tool operators;

a plurality of tool grips mounted along each side of said transfer member, the number of grips on each side being equal to the number of said tool operators so that the grips at each side grip the previously used tools in the several tool operators and the selected tools in the magazines;

means operating said transfer member to carry out a tool transfer operation for interchanging the tools in said tool operators and said magazines including means to move said tool grips into or out of tool gripping position;

means moving said transfer member in the act of removing or inserting tools in said tool operators and magazines; and means for rotating said transfer member wherein all of the grips are bodily rotated simultaneously so that the previously used tools are aligned with the magazines and the selected tools are aligned with the tool operators.

4. In a machine tool:

a frame;

a source of power;

a plurality of spindles supported by the frame for movement between a work zone and a tool change position, said spindles being adapted to operably receive tools for performing work operations;

a plurality of tool storage magazines movably carried by said frame and disposed at the tool change position, each of said storage magazines being adapted to carry a plurality of tools;

tool selection means connected to regulate the operation of said tool storage magazines for selectively locating a desired tool in each of said magazines at the tool change position for transfer to said spindles;

a plurality of tool transfer member each having a pair of tool grips;

means mounting said tool transfer member for movement into simultaneous engagement with tools in the tool operators and the selected tool in said magazines;

means connected to effect the simultaneous movement of said tool transfer members for simultaneously withdrawing the previously used tools out of said tool operators and the selected new tools out of said magazines or to insert the selected new tools into said tool operators and the previously used tool into said magazines for storage; and means connected to effect the simultaneous bodily movement of said tool transfer members for interchanging the position of the previously used tools withdrawn from the tool operators and the selected new tools withdrawn from said storage magazines so that the new tools will be inserted into the tool operators and the previously used tools are returned to storage in said magazines.

5. A tool changer including:

a post mounted for reciprocation and for rotation;

means for reciprocating said post;

means for rotating said post;

a slide mounted for transverse reciprocation at the top of said post; and means for reciprocating said slide and a plurality of sets of tool grippers mounted in spaced relation along said slide.